US009135600B2

(12) United States Patent
Rigdon et al.

(10) Patent No.: US 9,135,600 B2
(45) Date of Patent: Sep. 15, 2015

(54) METHODS AND SYSTEMS FOR PROVIDING REAL-TIME INFORMATION REGARDING OBJECTS IN A SOCIAL NETWORK

(75) Inventors: Debra A. Rigdon, Kent, WA (US); Timothy A. Tibbetts, Renton, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 13/486,823

(22) Filed: Jun. 1, 2012

(65) Prior Publication Data

US 2013/0325947 A1    Dec. 5, 2013

(51) Int. Cl.
*H04L 29/08* (2006.01)
*G06Q 10/10* (2012.01)
*G06F 17/27* (2006.01)
*H04L 12/58* (2006.01)
*G06Q 50/00* (2012.01)

(52) U.S. Cl.
CPC ............... *G06Q 10/10* (2013.01); *G06F 17/27* (2013.01); *G06F 17/2725* (2013.01); *G06Q 50/01* (2013.01); *H04L 51/32* (2013.01); *H04L 67/22* (2013.01); *H04L 67/306* (2013.01)

(58) Field of Classification Search
CPC ....... H04L 51/32; H04L 67/22; H04L 67/306; G06F 17/27; G06F 17/2725; G06Q 30/0201; G06Q 50/01
USPC .................. 709/203, 204, 206, 223, 224, 246; 726/2, 5
See application file for complete search history.

(56) References Cited

U.S. PATENT DOCUMENTS

| | | | |
|---|---|---|---|
| 8,027,975 B2 | 9/2011 | Gabriel et al. | |
| 8,060,508 B2 | 11/2011 | Gabriel et al. | |
| 8,185,448 B1 | 5/2012 | Myslinski | |
| 8,261,090 B1* | 9/2012 | Matsuoka | 726/2 |
| 8,444,048 B1* | 5/2013 | Nidamarthi et al. | 235/375 |
| 2007/0097959 A1* | 5/2007 | Taylor | 370/352 |
| 2009/0070334 A1* | 3/2009 | Callahan et al. | 707/9 |
| 2009/0150222 A1 | 6/2009 | Polonsky | |
| 2009/0276233 A1 | 11/2009 | Brimhall et al. | |
| 2010/0250676 A1 | 9/2010 | Ufford et al. | |
| 2010/0319031 A1* | 12/2010 | Lee et al. | 725/46 |
| 2011/0029512 A1* | 2/2011 | Folgner et al. | 707/726 |
| 2011/0045842 A1* | 2/2011 | Rork et al. | 455/456.1 |
| 2011/0055017 A1* | 3/2011 | Solomon et al. | 705/14.66 |
| 2011/0078188 A1 | 3/2011 | Li et al. | |
| 2011/0208684 A1* | 8/2011 | Dube et al. | 706/52 |
| 2012/0046029 A1* | 2/2012 | Sylvain et al. | 455/445 |
| 2012/0117144 A1* | 5/2012 | Douillet et al. | 709/203 |
| 2012/0284779 A1* | 11/2012 | Ingrassia et al. | 726/5 |
| 2012/0323558 A1* | 12/2012 | Nolan et al. | 704/9 |
| 2013/0036169 A1* | 2/2013 | Quigley et al. | 709/204 |
| 2013/0097236 A1* | 4/2013 | Khorashadi et al. | 709/204 |
| 2013/0151330 A1* | 6/2013 | Evancich et al. | 705/14.41 |
| 2013/0325947 A1* | 12/2013 | Rigdon et al. | 709/204 |

* cited by examiner

*Primary Examiner* — Ramy M Osman
(74) *Attorney, Agent, or Firm* — Armstrong Teasdale LLP (57) ABSTRACT

A method of providing real-time information regarding objects in a social network includes receiving updated information regarding the social network, and determining, by a processor, an effect of the updated information on a set of existing social network information. The method also includes incrementally updating, by a processor, the set of existing social network information, and providing the updated set of social network information.

16 Claims, 4 Drawing Sheets

METHODS AND SYSTEMS FOR PROVIDING REAL-TIME INFORMATION REGARDING OBJECTS IN A SOCIAL NETWORK

BACKGROUND

The field of the disclosure relates generally to social networking, and more specifically, to methods and systems for providing real-time information regarding objects in a network.

At least some known information systems provide data regarding connections and relationships between people and/or other entities in a particular setting or environment. Such systems may illustrate the connections and relationships as a social network. However, such social networks may include data that is obsolete and/or static in nature.

In addition, at least some known social networks may not reconcile data regarding the people and/or entities in the network and the connections or relationships between the people and/or entities. For example, certain sources of information used to construct the social network may provide incorrect information, either deliberately or inadvertently. Accordingly, such social networks may contain inaccurate information, thus causing decision makers using the social network to make faulty decisions based on the inaccurate information.

BRIEF DESCRIPTION

In one aspect, a method of providing real-time information regarding objects in a social network is provided that includes receiving updated information regarding the social network, and determining, by a processor, an effect of the updated information on a set of existing social network information. The method also includes incrementally updating, by a processor, the set of existing social network information, and providing the updated set of social network information.

In another aspect, a system is provided that includes a client computing device including a first processor and a server including a second processor. The client computing device is configured to receive an input representative of updated information regarding a network of objects, and the server is configured to store a set of existing network information representative of the network. The server is further configured to receive the updated information from the client computing device, determine an effect of the updated information on the set of existing network information, incrementally update the set of existing network information, and provide the updated set of network information.

The features, functions, and advantages that have been discussed can be achieved independently in various embodiments or may be combined in yet other embodiments, further details of which can be seen with reference to the following description and drawings.

DETAILED DESCRIPTION

Figure 1:
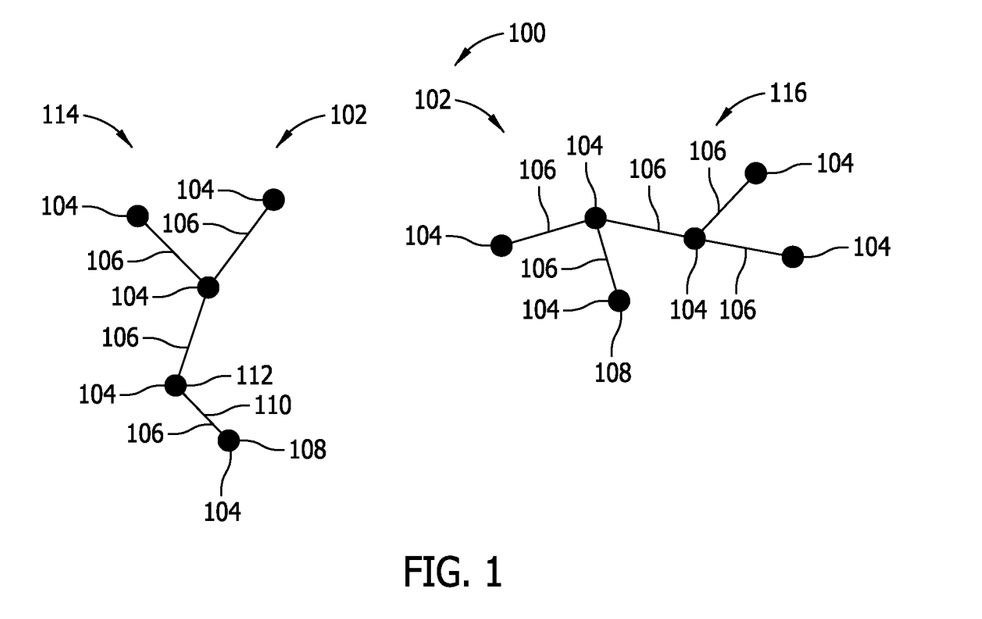
FIG. 1 illustrates an exemplary network of objects that includes a plurality of subnetworks.
Figure 2:
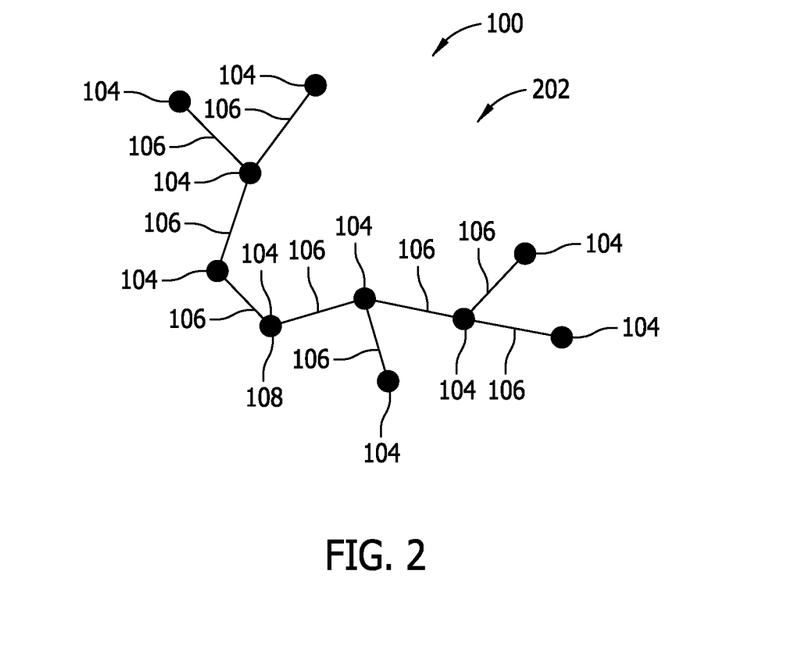
FIG. 2 illustrates an exemplary combination of the subnetworks shown in FIG. 1.

FIG. 1 illustrates an exemplary network 100 of objects. FIG. 2 illustrates a combination of subnetworks 102 within network 100. In the exemplary embodiment, network 100 is a social network of people. Alternatively, network 100 is any other network of objects that enables network 100 to function as described herein. As used herein, the term "social network" refers to a network based on, and illustrating or identifying, relationships or other connections between people and/or entities.

Each object is represented as a node 104 within network 100. Moreover, in the exemplary embodiment, network 100 includes a plurality of subnetworks 102 that each includes a plurality of nodes 104. Each node 104 is connected to at least one other node 104 by a link 106 (sometimes referred to as a relationship or a connection).

In the exemplary embodiment, each object represented within network 100 is a person or another entity. Alternatively, objects may include, for example, manufacturing items, organizations, transportation entities, phones, containers, and/or any other object that may be represented by network 100.

Links 106, in the exemplary embodiment, are representative of connections, or relationships, between nodes 104. For example, links 106 may represent, but are not limited to only representing, familial relationships, friendships, acquaintances, geospatial relationships, temporal relationships, occupational relationships, organizational relationships, and/or any other connection or relationship between nodes 104 (and the objects represented by nodes 104). It should be recognized that links 106 may each represent a plurality of relationships between nodes 104. For example, a first node 108 may be connected (via a first link 110) to a second node 112. First link 110 may represent, for example, a familial relationship between first node 108 and second node 112, and may also represent an organizational relationship between first node 108 and second node 112 (i.e., first node 108 and second node 112 belong to, or are associated with, the same organization).

Subnetworks 102 represent groupings or categorizations of nodes 104 and associated links 106. For example, a first subnetwork 114 may represent a grouping of people within an organization, and a second subnetwork 116 may represent a grouping of people within a town or a city. In another example, first subnetwork 114 may represent a first partial grouping of people within a town or city, and second subnetwork 116 may represent a second partial grouping of people within the town or city. Moreover, in one embodiment, first subnetwork 114 may at least partially overlap second subnetwork 116 such that one or more nodes 104 are common to first subnetwork 114 and second subnetwork 116. For example, first node 108 may be included within first subnetwork 114 and second subnetwork 116 such that first subnetwork 114 and second subnetwork 116 illustrate different links 106 branching out from first node 108.

As illustrated in FIG. 2, a plurality of subnetworks 102 may be merged into a combined subnetwork 202 of objects. More specifically, in the embodiment shown in FIG. 2, first subnetwork 114 and second subnetwork 116 are merged into combined subnetwork 202 based on nodes 104 (e.g., first node 108) that are common to (or similar to, but not exactly matching) first subnetwork 114 and second subnetwork 116. For example, one or more attributes of a node 104 within first subnetwork 114 may be different than attributes of a node 104 within second subnetwork 116, but the attributes may have an amount of overlap or similarity (e.g., node 104 is connected to other nodes in first subnetwork 114 in a similar manner as in second subnetwork 116) to determine that node 104 is the same node in both first subnetwork 114 and second subnetwork 116. In other words, a node 104 may be identified within first subnetwork 114 and another node 104 may be identified within second subnetwork 116. The identified nodes 104 may be different (i.e., not identical) but may share common attributes. Accordingly, node 104 of first subnetwork 114 may be determined to be the same node as node 104 of second subnetwork 116 such that first subnetwork 114 may be merged with second subnetwork 116.

Figure 3:
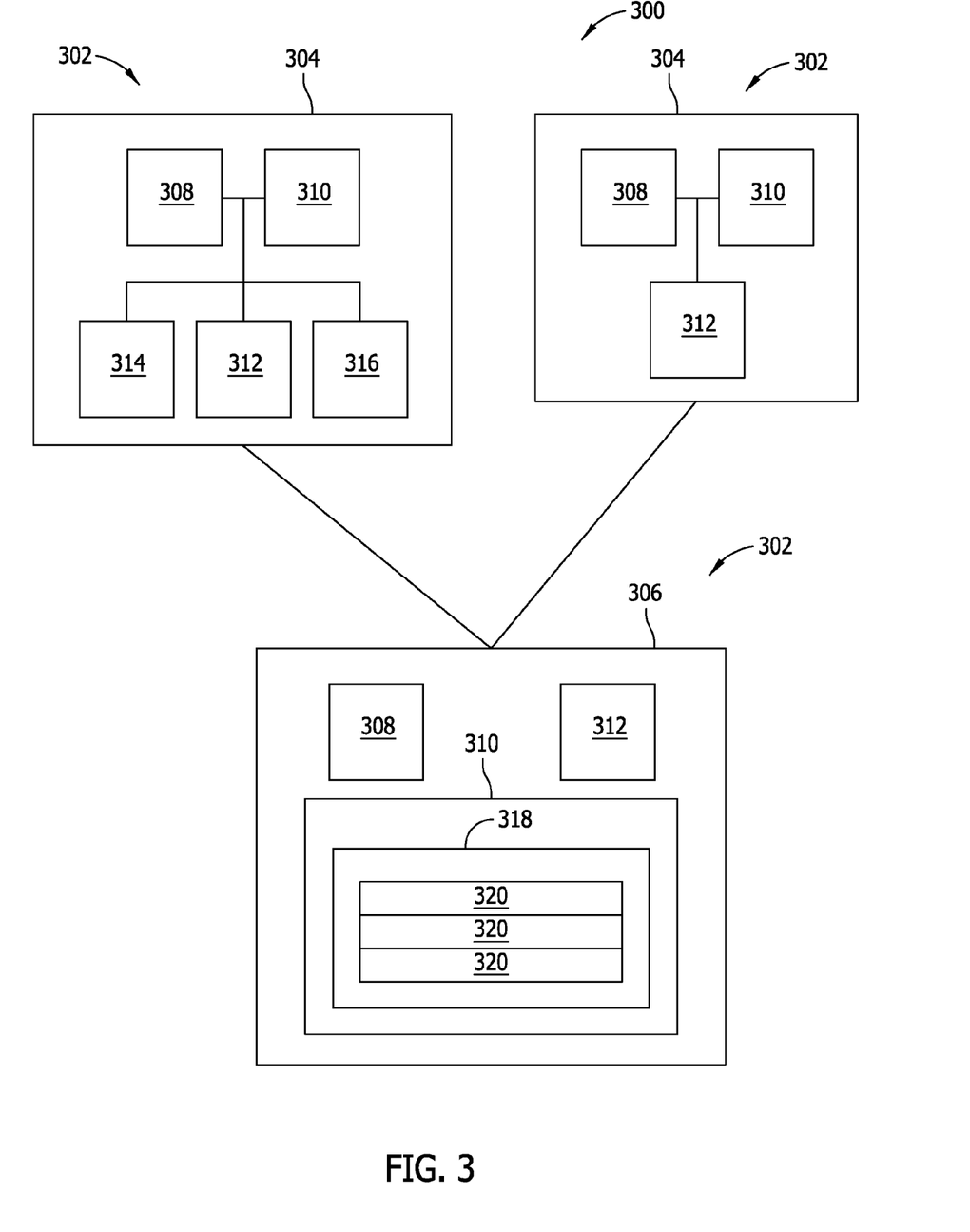
FIG. 3 illustrates an exemplary system that may be used to update the network shown in FIG. 1.

FIG. 3 is a block diagram of an exemplary system 300 that may be used to implement and/or update a network of objects, such as network 100 (shown in FIG. 1). In the exemplary embodiment, system 300 includes a plurality of computing devices 302, such as one or more client computing devices 304 (also referred to herein as "clients 304") and one or more server computing devices 306 (also referred to herein as "servers 306") (only one shown in FIG. 3).

Each computing device 302 includes a processor 308, a memory device 310, and a communication device 312. Moreover, one or more computing devices 302 may include a user input device 314 and/or a display 316.

Processor 308 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 310 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 310 includes data and/or instructions that are executable by processor 308 (i.e., processor 308 is programmed by the instructions) to enable processor 308 to perform the functions described herein.

Communication device 312 may include, without limitation, a network interface controller (NIC), a network adapter, a transceiver, a public switched telephone network (PSTN) interface controller, or any other communication device that enables system 300 to operate as described herein. Communication device 312 may connect to communication devices 312 of other computing devices 302 using any suitable communication protocol, such as a wired Ethernet protocol or a wireless Ethernet protocol.

User input device 314 includes, without limitation, a keyboard, a keypad, a touch-sensitive screen, a mouse, a scroll wheel, a pointing device, an audio input device employing speech-recognition software, and/or any suitable device that enables a user to input data into communication device 312 and/or retrieve data from communication device 312. Display 316 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user.

In the exemplary embodiment, server 306 stores data, or a set of information, representative of network 100 in memory device 310. More specifically, memory device 310 of server 306 includes a database 318 (or another suitable relational data construct), and server 306 stores the data representative of network 100 in database 318. In some embodiments, database 318 is located remotely from server 306 and is accessible by server 306.

Database 318 includes data fields 320 for each node 104 and/or link 106 for entering data about nodes 104 and/or links 106 to adjacent or related nodes 104. In the exemplary embodiment, data fields 320 for a subject node 104 and/or link 106 include, but are not limited to only including, one or more other nodes 104 linked to subject node 104, a type or category of link 106 (e.g., familial relationship, friendships, acquaintances, geospatial relationships, temporal relationships, occupational relationships, organizational relationships), a direction of link 106 (e.g., indicating a direction of control or relationship, such as from subject node 104 to linked node 104 or from linked node 104 to subject node 104), a determined strength or confidence level of node 104 and/or link 106, and/or any other data that enables system 300 to function as described herein. The strength or confidence level of node 104 and/or link 106 may be based on a number of correlations with other data in network 100, a type or category of correlations, an identity of a source of the updated information (e.g., a family member, eyewitness account, etc.), and/or any other correlation or factor that enables system 300 to function as described herein.

Clients 304 receive data representative of updated information regarding network 100, and transmit the updated information to server 306, via communication device 312 of client 304. Server 306 receives the updated information, via communication device 312 of server 306, and uses automated reasoning to determine an effect of the updated information on network 100.

As used herein, the term "automated reasoning" refers to analyzing data and arriving at conclusions based on the data using one or more computing devices or other processor-based systems. In an embodiment, automated reasoning includes reasoning based on artificial intelligence, including, but not limited to, deductive and inductive reasoning.

In the exemplary embodiment, the updated information includes, but is not limited to only including, additional nodes 104 to be added to network 100 or to one or more subnetworks 102, additional links 106 between nodes 104, additional data associated with links 106 and/or nodes 104 (e.g., the source of information for link 106 and/or node 104), a change to nodes 104 and/or links 106 (including removal of nodes 104 and/or links 106 from network 100 and/or one or more subnetworks 102), a change to data associated with links 106 and/or nodes 104 (including changes to, and/or removal of, one or more data fields 320 and/or data within data fields 320), and/or any other information that enables system 300 to function as described herein.

Server 306 determines the effect of the updated information, for example, by analyzing the updated information and performing automated reasoning based on the updated information and the data stored in database 318 regarding network 100. In the exemplary embodiment, determining the effect of the updated information using the automated reasoning includes, but is not limited to only including, identifying relationships or links 106 between nodes 104, initiating one or more searches for new information regarding network 100, hypothesizing about an existence of new groups or categories of nodes 104 and/or evaluating a likelihood that specific nodes 104 are members of the new groups or categories, merging one or more subnetworks 102 to form a combined subnetwork 202 (shown in FIG. 2), determining a strength or confidence level for links 106, evaluating a likelihood that nodes 104, links 106, and/or sources of information are incorrect, deceptive in nature, and/or are prone to misinformation (i.e., untrustworthy), and/or any other aspect that enables system 300 to function as described herein.

Server 306 updates, such as incrementally updates, network 100 (e.g., the set of information representative of network 100 stored in database 318) based on the determined effect of the updated information. As used herein, the term "incrementally update" refers to updating a portion of a network or another construct, in contrast to building or rebuilding a complete network. For example, server 306 may incrementally update network 100 by merging subnetworks 102 that are identified as sharing one or more nodes 104, adding or removing one or more links 106 between nodes 104, adding or removing one or more nodes 104, and/or adding, removing, or changing data associated with links 106 and/or nodes 104. Accordingly, in at least one embodiment, the incremental update of network 100 causes only the portion of network 100 that is changed to be updated, such that the entire network 100 is not re-generated when new information is incorporated therein.

In the exemplary embodiment, the determination of the effect of the updated information (e.g., the automated reasoning) and/or the updating of network 100 is accomplished in real-time. As used herein, the term "real-time" refers to processing inputs as they are received such that an output is provided at substantially the same time as inputs affecting the output are received, taking into account a time for processing the inputs.

During operation, server 306 stores data representative of network 100 in database 318, for example. Server 306 may present network 100, and/or the data representative of network 100, to one or more clients 304 such that a visual representation of network 100 is displayed on client 304. A user accesses client 304 and inputs updated information associated with one or more portions of network 100. For example, a user may gather data about members of a town, a workplace, or an organization and may enter the data into one or more clients 304 for use in updating network 100. The examples described herein should be viewed as illustrative, rather than in a limiting manner.

The updated information is transmitted from client 304 to server 306, and server 306 determines the effect of the updated information on network 100 (i.e., on the set of existing information representative of network 100) in real-time using automated reasoning. For example, if first node 108 is included within first subnetwork 114, and the updated information includes adding first node 108 to second subnetwork 116, server 306 may determine that first subnetwork 114 and second subnetwork 116 should be merged at first node 108. As another example, if the updated information indicates that a formerly friendly organization has become hostile, server 306 may automatically update the status of each node 104 and/or link 106 associated with the organization to a hostile status. Additionally or alternatively, server 306 may conduct a search, such as an Internet-based search, for additional information to supplement and/or determine the effect of the updated information, may compare the updated information to existing information regarding a node 104, a link 106, or another aspect of network 100 to determine whether the updated information is accurate, may determine or calculate a confidence level of the updated information, and/or may determine any other effect of the updated information on the set of existing information of network 100.

Server 306 updates network 100 (i.e., the information of network 100) based on the updated information and the determined effect of the updated information. In one embodiment, server 306 compares the confidence level of the updated information with a predetermined threshold. If the confidence level of the updated information equals or exceeds the predetermined threshold, server 306 updates network 100 with the updated information. In contrast, if the confidence level of the updated information is less than the predetermined threshold, server 306 does not update network 100 with the updated information. The updated network 100 may be provided or transmitted back to clients 304 in real-time so that users may view the updates to network 100 in real-time. In one embodiment, the updated network 100 may be presented to a human analyst or another person to determine whether the updated network 100 is likely to be correct and/or whether a link 106 and/or a node 104 should be updated, for example.

Moreover, if new information (such as additional nodes 104 and/or links 106) is received that does not fit within network 100, server 306 creates a new network with the new information. The new network may be updated and/or merged with other networks in a similar manner as described above.

Figure 4:
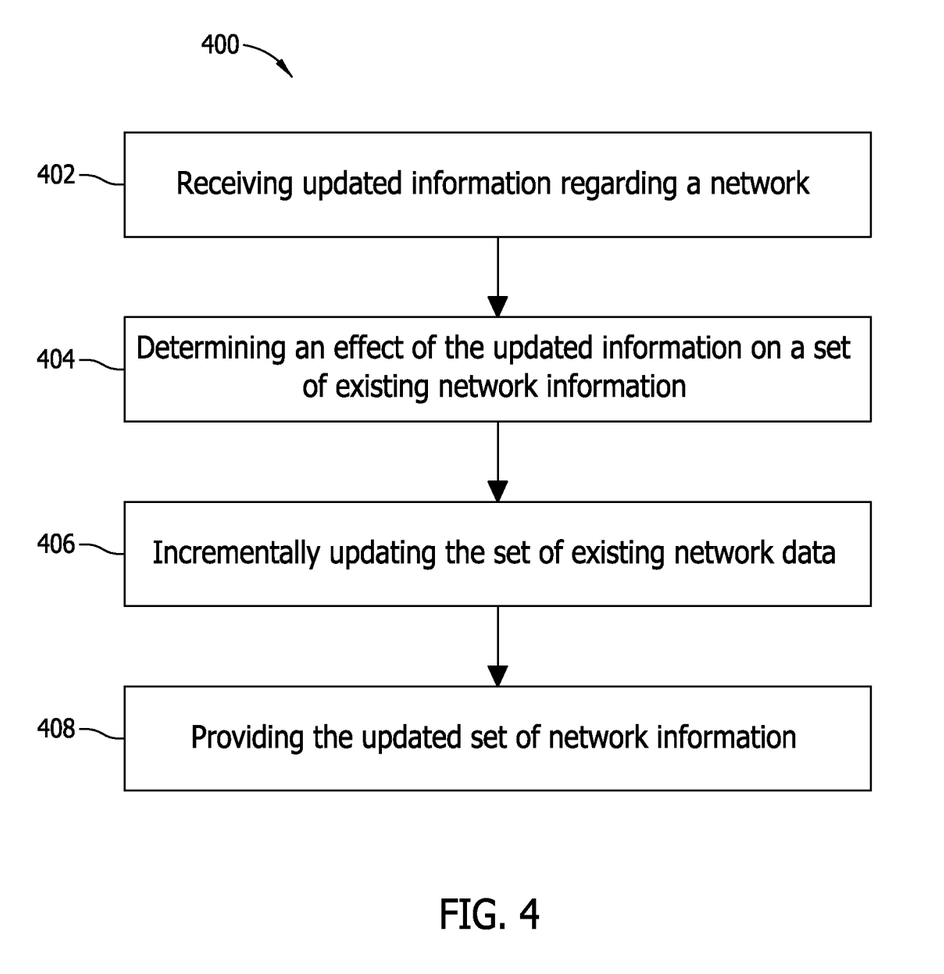
FIG. 4 is a flow diagram of an exemplary method that may be executed by the system of FIG. 3 to provide real-time information regarding objects in a network, such as the network shown in FIG. 1.

FIG. 4 is a flow diagram of an exemplary method 400 of providing real-time information regarding objects in a network, such as network 100 (shown in FIG. 1) that may be executed by system 300 (shown in FIG. 3). More specifically, in the exemplary embodiment, method 400 is at least partially executed by processor 308 of server 306 (shown in FIG. 3).

Method 400 includes receiving 402 updated information regarding a network, such as network 100. In one embodiment, a user enters the updated information into a client 304, and client 304 transmits the updated information to server 306 (both shown in FIG. 3). Server 306 receives 402 the updated information and determines 404 an effect of the updated information on a set of existing network information (i.e., on a set of existing information regarding network 100).

In the exemplary embodiment, server 306 determines 404 the effect of the updated information using automated reasoning. For example, server 306 determines that one or more subnetworks 102 (shown in FIG. 1) should be merged, one or more nodes 104 should be added or removed, one or more links 106 should be added or removed, and/or one or more data fields 320 (shown in FIG. 3) and/or data stored therein should be added, removed, or changed.

After the effect of the updated information is determined 404, server 306 incrementally updates 406 the set of existing network data. For example, server 306 merges first subnetwork 114 with second subnetwork 116 and/or adds one or more nodes 104, links 106, and/or data within network 100. In one embodiment, server 306 updates data associated with links 106 to update relationships represented by links 106. For example, a familial relationship between first node 108 and second node 112 may be updated to reflect that first node 108 is a parent of second node 112. As another example, a relationship between first node 108 and second node 112 may be changed from friendly to hostile (or from hostile to friendly) based on updated information received 402 above. The updated set of network information is provided 408, for example, from server 306 to a user via client 304, or to another device or system. In one embodiment, client 304 displays the updated set of network information (e.g., displays network 100) on display 316.

Figure 5:
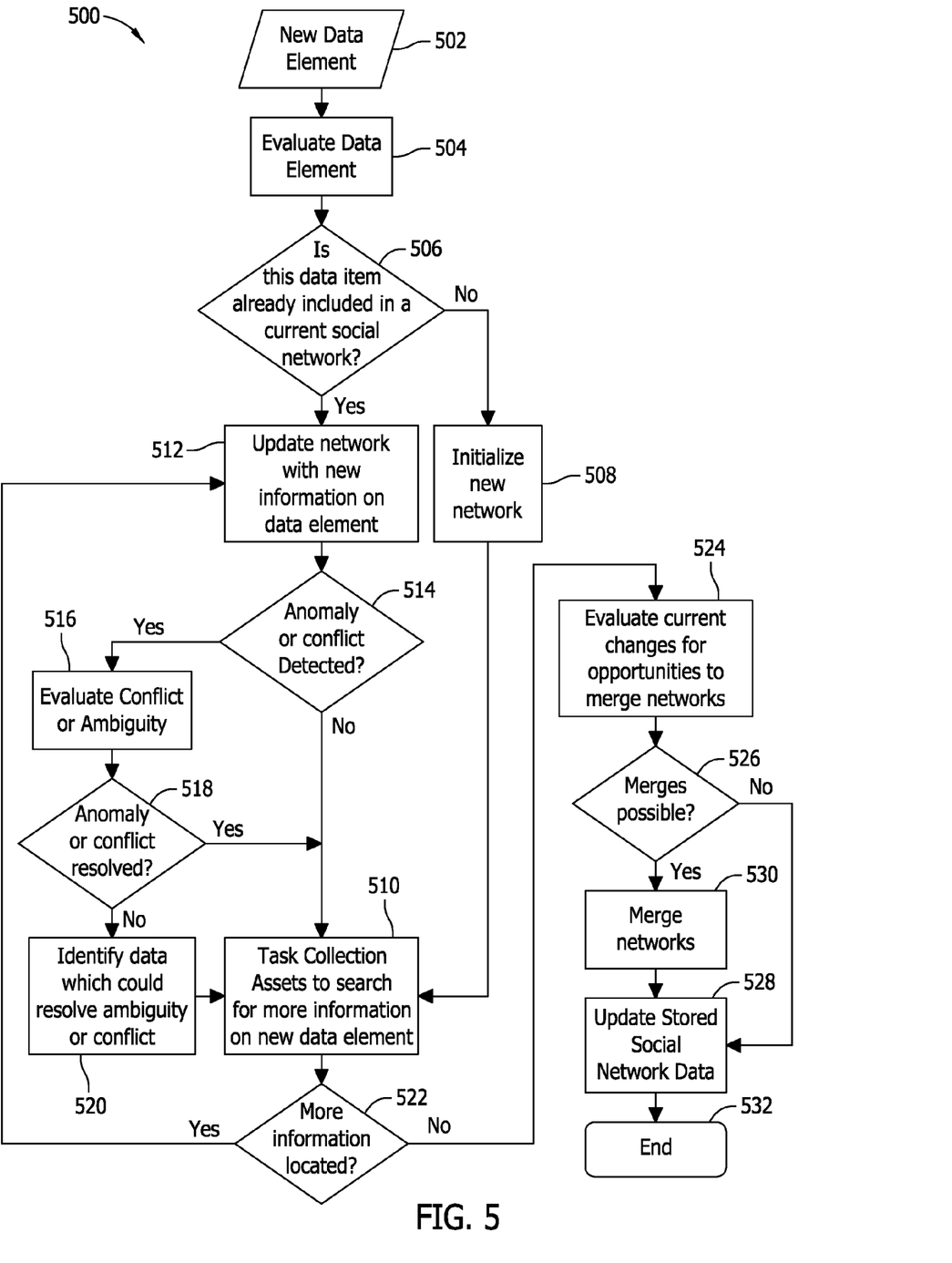
FIG. 5 is a flow diagram of an exemplary method that may be executed by the system of FIG. 3 to update a network, such as the network shown in FIG. 1.

FIG. 5 is a flow diagram of an exemplary method 500 of updating a network, such as network 100 (shown in FIG. 1) that may be executed by system 300 (shown in FIG. 3). More specifically, in the exemplary embodiment, method 400 is at least partially executed by processor 308 of server 306 (shown in FIG. 3).

Method 500 includes receiving 502 a data element, such as a node 104 or a link 106. In the exemplary embodiment, a user enters the data element into client 304, and client 304 transmits the data element to server 306 (both shown in FIG. 3). Server 306 receives 502 the data element and evaluates 504 the data element to determine the effect of the data element on network 100. Server 306 determines 506 whether the data element is already included within a current social network, such as network 100. If server 306 determines 506 that the data element is not already included in network 100, server 306 creates or initializes 508 a new network that includes the data element. Server 306 may task 510 one or more agents (also referred to as collection assets) to search for, and collect, additional information on the new data element. The additional information may include, for example, additional links 106 to be added to the data element, additional data fields 320 and/or data for data fields 320 to be added to the data element, and/or any other information that enables method 500 to function as described herein.

However, if server 306 determines 506 whether the data element is already included within network 100 (e.g., if node 104 and/or link 106 is included within network 100), server 306 updates 512 network 100 with the information associated with the data element. For example, if the data element includes additional information for one or more data fields 320, server 306 updates data fields 320 with the information.

Server 306 determines 514 whether an anomaly or a conflict exists with respect to updating network 100 with the new data element. For example, server 306 may detect that data within a data field 320 of the new data element contradicts pre-existing data within network 100 (e.g., within node 104 and/or link 106 associated with the new data element). If no conflict or anomaly is detected, server 306 may task 510 one or more agents to collect additional data for the new data element as described above.

If server 306 determines 514 that a conflict or an anomaly exists, server 306 evaluates 516 the conflict or anomaly to determine whether the conflict or anomaly is able to be resolved by server 306. For example, server 306 may determine that the conflict is a misspelling of a name that is resolvable by verifying the correct spelling of the name using other data within network 100 or outside of network 100. If server 306 is able, server 306 resolves the conflict or anomaly. In the example above, server 306 replaces the misspelled name with the correct spelling of the name within network 100. If server 306 determines 518 that the conflict or anomaly is resolved, server 306 may task 510 one or more agents to search for additional information as described above. Alternatively, if server 306 determines 518 that the conflict or anomaly is not resolved, server 306 identifies 520 additional data, if applicable, that may be obtained to resolve the conflict or ambiguity. Server 306 tasks 510 the agent or agents to obtain the identified information.

If server 306 determines 522 that additional information has been located or obtained by the agents, server 306 updates 512 network 100 with the additional information as described above. However, if server 306 determines 522 that no additional information has been obtained, server 306 evaluates 524 the current changes or updates to network 100 to determine whether there are opportunities to merge network 100 with another network, and/or to merge subnetworks 102 together.

If server 306 determines 526 that a merge of networks and/or subnetworks is not possible, either because the networks and/or subnetworks do not share sufficient similarities such as common nodes 104 and/or links 106, server 306 updates 528 the stored data associated with network 100. For example, server 306 stores the changes and/or updates to network 100 in a memory, such as memory device 310.

If server 306 determines 526 that a merge of networks and/or subnetworks are possible, server 306 merges 530 the networks and/or subnetworks together based on common nodes 104, links 106, and/or other common aspects of the networks and/or subnetworks. Server 306 updates 528 the stored data associated with network 100 to include, for example, the changes and/or updates to network 100 and data representative of the merging of the networks and/or subnetworks. Once the updates 528 are completed, method 500 ends 532.

A technical effect of the methods and systems described herein includes at least one of: (a) receiving updated information regarding a social network; (b) determining, by a processor, an effect of updated information on a set of existing social network information; (c) incrementally updating, by a processor, a set of existing social network information; and (d) providing an updated set of social network information.

The embodiments described herein provide updated, real-time information regarding objects of a network, such as a social network. A set of existing information representative of the network is stored in a server. Updated information is input into a client computing device and is transmitted to the server. The server determines an effect of the updated information on the set of existing network information, for example, using automated reasoning. Once the effect is determined, the server incrementally updates the set of existing information based on the updated information, and provides the updated set of information, for example, to a user or client computing device. As such, the network described herein is facilitated to be updated in real-time, and information regarding the network may be validated. Accordingly, the network described herein is facilitated to be more accurate as compared to at least some known prior art networks.

Exemplary embodiments of systems and methods for providing real-time information regarding objects of a network are described above in detail. The systems and the methods are not limited to the specific embodiments described herein but, rather, components of the systems and/or steps of the methods may be utilized independently and separately from other components and/or steps described herein. Further, the described operations and/or components may also be defined in, or used in combination with, other systems, methods, and/or networks, and are not limited to practice with only the system as described herein.

Although the present embodiments are described in connection with providing information regarding a social network, the embodiments are operational to provide information regarding other networks or other characteristics of objects. The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing real-time information regarding objects in a social network, said method comprising:
   receiving updated information regarding at least one of an object and a link between objects associated with the social network;
   determining, by a processor, using automated reasoning, an effect of the updated information on a set of existing social network information by identifying links between the objects of social network as affected by the updated information;
   initiating, by the processor, a search for additional information associated with the social network based on the updated information;
   predicting an existence of a new subnetwork of related objects within the social network based on the identified links and the search for additional information;
   determining, using automated reasoning, a confidence level of the updated information based on the effect of the updated information;
   determining that the confidence level exceeds a predetermined threshold;
   based on the confidence level exceeding the predetermined threshold, incrementally updating, by a processor, the set of existing social network information based on the determined effect, the updated set of social network information including the identified links, the additional information, and the predicted existence of the new subnetwork of related objects; and
   providing the updated set of social network information.

2. The method of claim 1, wherein said providing the updated set of social network information is performed in real-time after said receiving updated information regarding the social network.

3. The method of claim 1, wherein said determining an effect of the updated information on a set of existing social networking information using automated reasoning further comprises merging a first subnetwork with a second subnetwork based on the updated information.

4. The method of claim 3, wherein merging the first subnetwork with the second subnetwork comprises identifying a first node within the first subnetwork and a second node within the second subnetwork and merging the first subnetwork with the second subnetwork based on the first node and the second node, wherein the first node is not identical to the second node and wherein the first node and the second node include common attributes.

5. The method of claim 1, wherein said determining an effect of the updated information on a set of existing social networking information using automated reasoning comprises determining a confidence level of a link between objects of the network.

6. The method of claim 1, wherein said determining an effect of the updated information on a set of existing social networking information using automated reasoning further comprises determining whether a source of the updated information is likely to be deceptive.

7. The method of claim 1, wherein said initiating the search for additional information associated with the social network based on the updated information comprises initiating the search for at least one of additional links between objects of the social network to be added to the updated information, additional data fields to be added to the updated information, and data for the data fields to be added to the updated information.

8. The method of claim 1, further comprising:
   determining, by the processor, whether the updated information is included in the social network;
   generating, by the processor, a new network that includes the updated information when it is determined that the updated information is not included in the social network; and
   updating at least one data field with the updated information when it is determined that the updated information is included in the social network.

9. A system comprising:
   a client computing device comprising a first processor, wherein said client computing device is configured to receive an input representative of updated information regarding at least one of an object and a link between objects associated with a network of objects; and
   a server comprising a second processor, wherein said server is configured to store a set of existing network information representative of the network, said server further configured to:
   receive the updated information from said client computing device;
   determine, using automated reasoning, an effect of the updated information on the set of existing network information by identifying links between the objects of the network as affected by the updated information;
   initiate a search for additional information associated with the network based on the updated information;
   predict an existence of a new subnetwork of related objects within the network based on the identified links and the search for additional information;
   determine, using automated reasoning, a confidence level of the updated information based on the effect of the updated information;
   determine that the confidence level exceeds a predetermined threshold;
   based on the confidence level exceeding the predetermined threshold, incrementally update the set of existing network information based on the determined effect, the updated set of network information including the identified links, the additional information, and the predicted existence of the new subnetwork of related objects; and
   provide the updated set of network information.

10. The system of claim 9, wherein said providing the updated set of network information is performed in real-time after the updated information regarding the network is received.

11. The system of claim 9, wherein said server is further configured to determine an effect of the updated information on the set of existing network information using automated reasoning.

12. The system of claim 11, wherein server is further configured to merge a first subnetwork with a second subnetwork based on the updated information.

13. The system of claim 9, wherein said server is further configured to determine a confidence level of a link between objects of the network.

14. The system of claim 9, wherein said server is further configured to identify a change to a previously determined link between objects of the network.

15. The system of claim 11, wherein said server is further configured to determine whether a source of the updated information is likely to be deceptive.

16. The system of claim 11, wherein said server is further configured to:
- determine whether the updated information is included in the social network;
- generate a new network that includes the updated information when it is determined that the updated information is not included in the social network; and
- update at least one data field with the updated information when it is determined that the updated information is included in the social network.

\* \* \* \* \*